Oct. 20, 1942.   C. H. WESTCOTT   2,299,670
DOWEL BAR STRUCTURE
Filed May 20, 1935   3 Sheets-Sheet 1
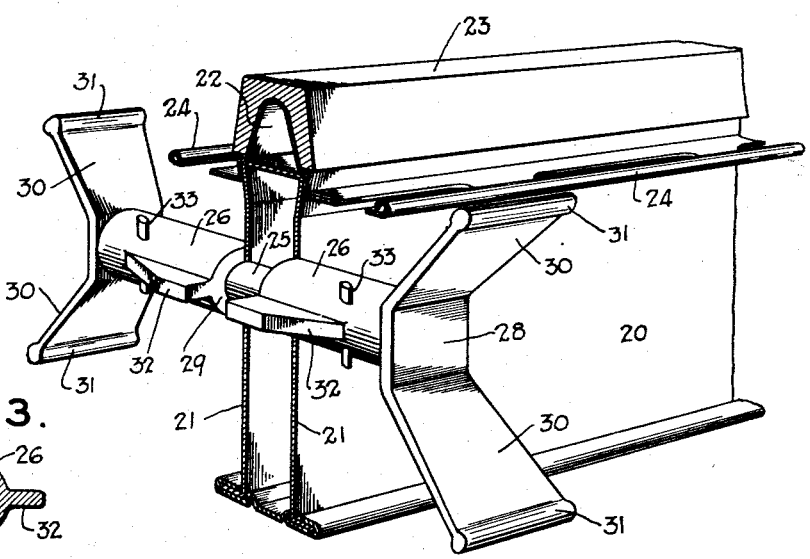
FIG. 1.
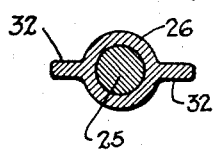
FIG. 3.
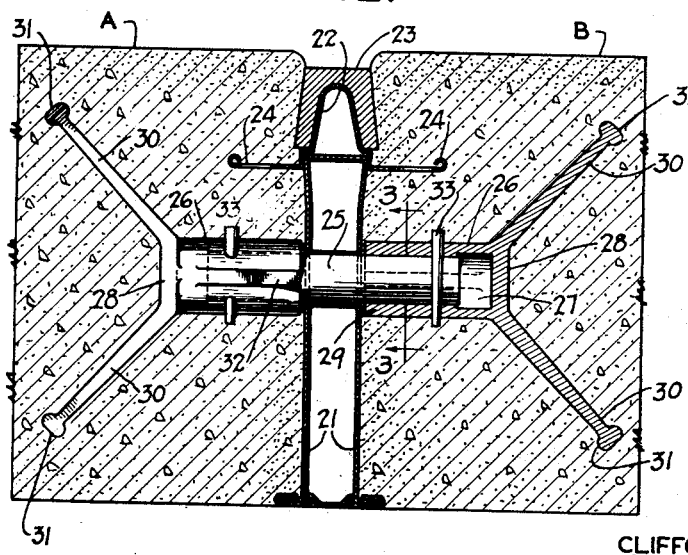
FIG. 2.
FIG. 4.
FIG. 5.
FIG. 6.
FIG. 7.
INVENTOR.
CLIFFORD H. WESTCOTT.
BY
HIS ATTORNEY.

Oct. 20, 1942.     C. H. WESTCOTT     2,299,670
DOWEL BAR STRUCTURE
Filed May 20, 1935     3 Sheets-Sheet 2
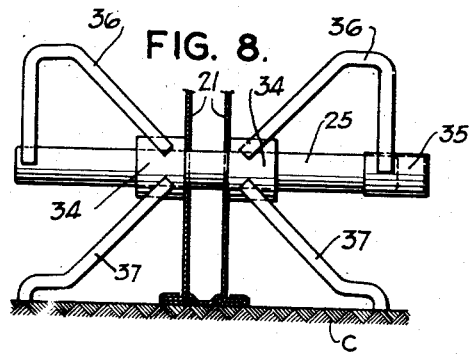
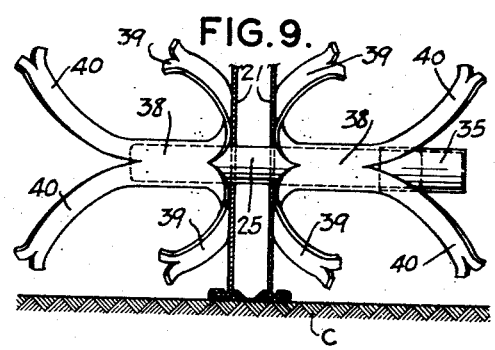
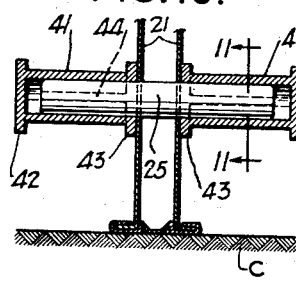
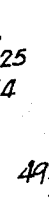
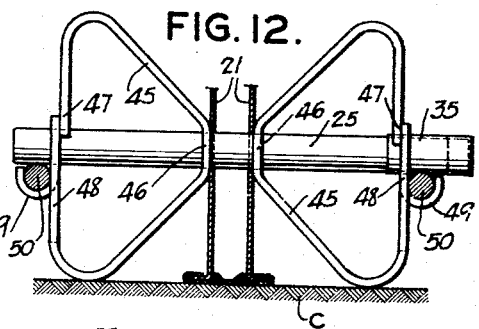
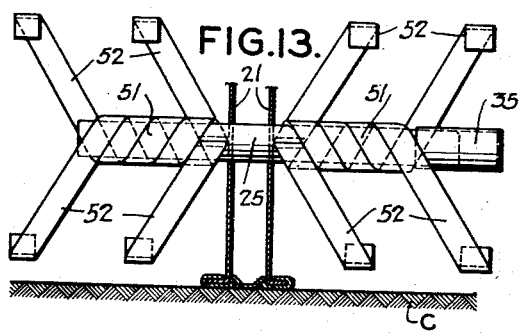
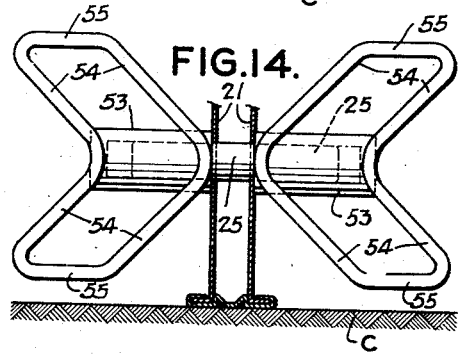
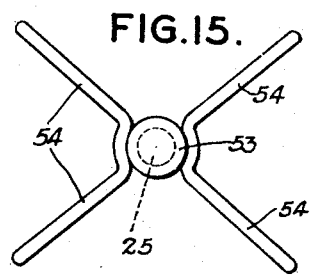
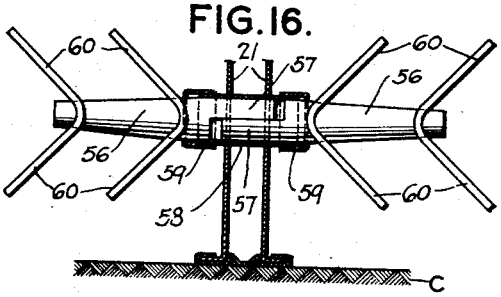
INVENTOR
CLIFFORD H. WESTCOTT.
BY /s/ His Attorney Oct. 20, 1942.     C. H. WESTCOTT     2,299,670
DOWEL BAR STRUCTURE
Filed May 20, 1935      3 Sheets-Sheet 3
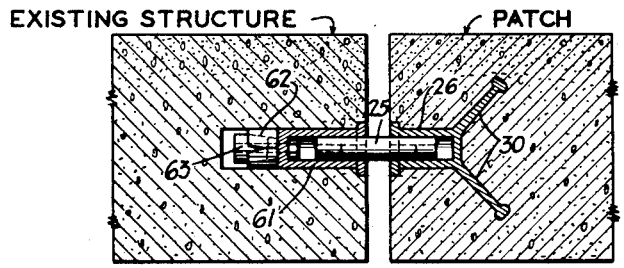
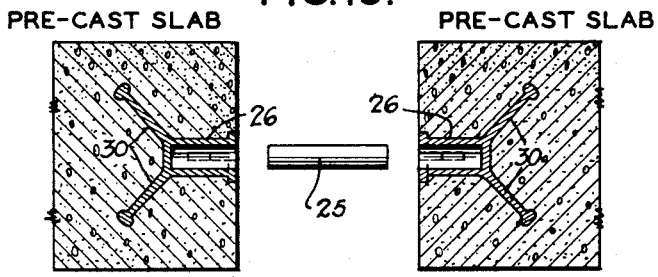
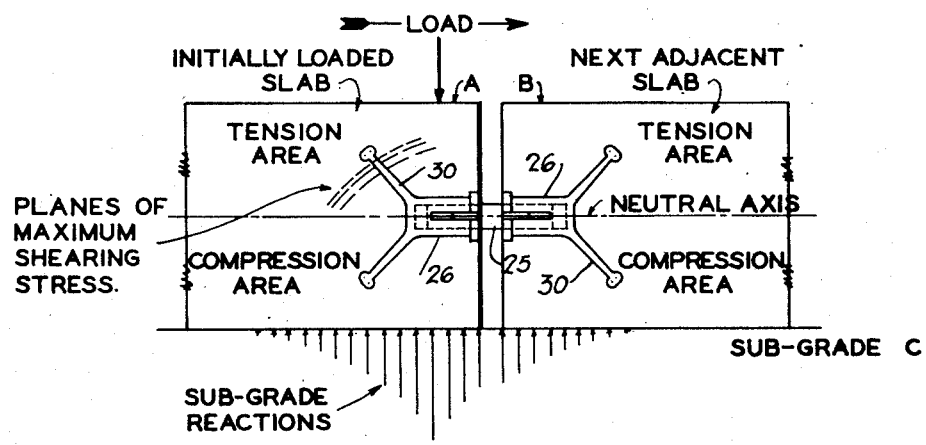
INVENTOR.
CLIFFORD H. WESTCOTT.
BY
HIS ATTORNEY.

Patented Oct. 20, 1942

2,299,670

UNITED STATES PATENT OFFICE 2,299,670

DOWEL BAR STRUCTURE

Clifford H. Westcott, Oak Park, Ill., assignor, by mesne assignments, to Cal C. Chambers and Robert S. Bradshaw, Jr., St. Louis, Mo., as joint tenants Application May 20, 1935, Serial No. 22,308

4 Claims. (Cl. 94—18)

My present invention relates to highway construction and particularly to the building of concrete pavements and more particularly to a device for transferring road loads from one concrete slab to the next adjoining slab, and is an improvement over what is known as the common dowel bar.

It is well recognized in this art that concrete pavements are continually undergoing a change in volume, either due in a large sense to moisture content or temperature change, and that as these volume changes take place the concrete slabs under restraint will either rupture and establish natural joints or, preferably, mechanical joints are interposed at predetermined intervals which permit of the unrestrained and unrestricted movement of the slabs.

In order that the surface of the adjoining slabs may be maintained uniform and in substantially the same plane so as to obtain a comparatively smooth and uninterrupted surface for the motoring public, it has been customary for many years to dowel across from one slab to the next adjoining. The common dowel has been universally accepted as the most practical means for this purpose, but the common dowel has many deficiencies. The common dowel, economical due to its inherent shape, is lacking in bearing, and many methods have been devised and employed in distributing the bearing of the dowel, both to the face of the slab and to points back within the slab. Most of these devices are prohibitively expensive, both to manufacture and install. They are very cumbersome and create field difficulties and raise considerable uncertainty in engineers' minds as to their final positioning within the slabs after the concrete has set.

It is the province of the common dowel to first acquire a portion of a superimposed load, and to carry it across a joint or space between slabs, and then to distribute the load to the adjoining slab. It is, therefore, a paramount object of this invention to reduce the high bearing stresses existing at the edge of the slab by providing a greater bearing area in contact with the concrete at the edge of the slab, and to further reduce the high edge stress by virtue of radiating anchors which either absorb load or transmit and distribute the dowel loads to and within the slab and thereby eliminate high stress areas in the slab that would otherwise exist.

A further object is to decrease the deflection of the short dowel during periods of load transmission by furnishing a definite structural support for the body of the dowel, which not only eliminates channeling within the slab, but by so doing, also decreases deflection under periods of load transmission.

My object is to provide a shorter effective length of structural dowel member whereby the deflection of the dowel is materially reduced.

It is a further object to increase the load transmission capacity of a common dowel, as a dowel used for the purpose of load transmission is required to withstand bending and shearing stresses, and I materially reduce these bending stresses in a dowel by effectively reducing the length of the bar. I further increase the load transmission capacity of the dowel by virtue of this reduction in length with the consequent increased capacity in bending. Due to this shorter length and consequent smaller deflection the load transfer capacity of the dowel is considerably increased. Naturally, the amount of this increase also depends upon the thickness of the slab and the modulus of the subgrade reaction.

It is a further object of my invention to provide a load transmission device which will serve as a chair, or support, to position the dowel in proper alignment, and which structure may rest directly upon the sub grade and thereby support the dowel in actual alignment parallel to the surface of the sub grade and consequently parallel to the surface of the highway. I provide accessible means for providing and maintaining proper alignment of the dowel.

It is a still further object of my invention to provide an air space at the end of the short dowel so that the dowel may move freely to accommodate the movement of the adjoining slabs during periods of volume change.

My present invention has these and other objects, all of which are explained in detail and may be more readily understood when read in conjunction with the accompanying drawings (three sheets), which illustrate the preferred embodiment of my invention, it being manifest that changes and modifications may be resorted to without departure from the spirit of the claims forming a part hereof.

In the drawings:

Fig. 1 is a perspective view of a commercial type of expansion joint showing my invention in its relative association therewith;

Fig. 2 is a vertical section through the same type of expansion joint cast between adjoining slab sections, and likewise embodying the various features of my invention;

Fig. 3 is a transverse section through the dowel and bearing taken on line 3—3 of Fig. 2;

Fig. 4 is a cross-section through a conventional form of cylindrical or common dowel bar;

Fig. 5 is a like section through a dowel bar rectangular in cross-section;

Fig. 6 is a like section through a deformed bar;

Fig. 7 is a like section through an I-beam or H section bar;

Fig. 8 is an elevation of modified form expressing my invention as applied to the short dowel which is shown embedded in the lower section of a joint, the same being supported by and resting upon the sub grade. The concrete and the upper portion of the joint have been omitted for purposes of clearness;

Fig. 9 is a similar view of a further modification of load distribution means;

Fig. 10 is a still further modification;

Fig. 11 is a vertical section through the dowel and bearing on line 11—11 of Fig. 10;

Fig. 12, like Fig. 8, is a further modification of load transfer and distribution;

Fig. 13, like Fig. 12, is a further modification;

Fig. 14, like Fig. 12, is a still further modification;

Fig. 15 is an end view of the spiders or load distributing members of the dowel structure illustrated in Fig. 14;

Fig. 16, like Fig. 12, is an elevation of a still further modified form of load transfer;

Fig. 17 is a vertical section through adjoining slabs showing the placement of a still further modified form of load transfer;

Fig. 18, like Fig. 17, shows a still further modification; and

Fig. 19 is a diagrammatic presentation of the adjoining slabs showing their direct relation to the load transfer or dowel means, the applied load and sub grade reaction.

The structures illustrated involve the application of my invention to a roadway slab, and for purposes of description only, I choose to define my invention as applied to this particular construction; however, I wish it thoroughly understood that its adoption and use is equally applicable to any poured or pre-cast structure, whether it be a roadway slab or a retaining wall, dam, or building structure, for, as a matter of fact, it is applicable to almost an unlimited number of structures.

For purposes of illustration, I have shown a conventional type of expansion joint comprising a stool 20 with spaced side walls 21—21 closed at the bottom and supporting a metallic seal 22 with a mastic cap 23, the seal being provided with lateral anchors 24—24 adapted to be cast into adjoining slab sections A and B; and whereas I have shown and described such a joint, I wish it understood that any type of joint may be employed in conjunction with my invention, whether it be an expansion joint, contraction joint, or only a construction joint.

My invention consists in spanning the space or joint between the slabs A and B with a relatively short dowel bar 25 positioned at substantially mid-depth of the slabs and parallel with the top surface thereof and normal to the plane of the joint; and whereas I have shown the dowel 25 as the common rolled bar of circular cross-section, it will be apparent to those skilled in the art, that dowels of various cross-sections may be employed without departing from the spirit of my invention. Figs. 4, 5, 6 and 7 are illustrative (as before described) of the most commonly used steel sections employed for this purpose.

The ends of the dowel 25 are telescoped into a pair of bearings or sleeves 26—26 which are reamed to provide a snug and tight sliding fit for the dowel and of a length sufficient to provide an air chamber 27 of a depth equivalent to at least one half of the joint or space between the adjoining slabs. The outer ends of the sleeves are sealed with a wall 28, whereas the inner faces 29 are placed approximately flush with the face of their respective slab sections.

As shown at Figs. 1 and 2, a pair of radial arms 30—30 are cast integral with the walls 28 of the sleeves 26, the arms 30 diverge therefrom and approach (but do not penetrate) the surface, top and bottom, of their respective slabs. The outer ends of the arms 30 are enlarged in cross-section to establish bulb like sections or kobs 31.

And fins 32 are provided, which likewise radiate from the sleeve 26 from a point flush with the inner face 29 and taper back to a point approaching the wall 28, thereby providing greater bearing surface at the face of the slab.

In the assembly of this dowel structure, the dowel 25 is first passed through the joint with equal lengths protruding on each side thereof, the sleeves 26 are next placed over the protruding ends of the dowel as shown, and then temporarily keyed in place with soft metal pins 33 driven through aligning holes in the sleeve and dowel. The dowel structure just defined is assembled at intervals throughout the length of the mechanical joint, and at the desired spacing to accommodate the estimated loads the pavement is to carry. The entire structure, including the dowel assembly and the joint, is then placed upon the sub grade, and due to the particular assembly, the dowels are immediately in proper alignment, the slabs are then poured, cured, and the highway opened to traffic and the resultant application of moving wheel loads applied in turn.

In operation and as the moving wheel load approaches the joint traveling from the initially loaded slab A towards the next adjacent slab B (see Fig. 19) the load is absorbed by the dowel structure and particularly the radial arms 30, concentrated and then transmitted to the sleeve and dowel and thence across the joint to a like unit on the opposite side or next adjacent slab, where the concentrated load is dissipated through the sleeve and the radial arms and distributed into the slab structure. As the load crosses the joint and onto the next adjacent slab, the reverse of the above action starts at a maximum and diminishes as the load passes on. The short dowel remains at all times at or near the neutral axis of the slabs, whereas the radial arms 30 remain within the tension and compression areas intersecting the shear planes and reinforcing the edge of the slab. This action of the dowel structure absorbs and so distributes the load, that if failure occurs, it will take place outside of the field embraced by the dowel bar structure, thus effectively transmitting the full strength of one slab to the other without interruption; in fact, the employment of this structure insures the highway against joint failures, as the slab here, is stronger at the joint than at any other point. The fins 32 both increase the bearing value of the sleeve 26 in the concrete and assist in the distribution of load to such an extent as to prevent channeling of the concrete structure.

There are immediately many modifications which naturally present themselves to one skilled in the art.

Fig. 8 illustrates the short dowel 25 spanning a joint as before. Here, however, the sleeves 34 are relatively short, open at both ends, one end of the dowel being provided with a cushion cap 35. The radial arms 36 are affixed to the sleeve, extend upwardly (into the tension area) and then down to the dowel (neutral axis). The lower arms 37 extend downwardly and pass through the compression area and rest directly upon the subgrade C, and thus serve as a temporary support for the structure prior to and during the pouring of the concrete.

Fig. 9 illustrates the short dowel 25, and cushion cap 35 as assembled to the walls 21—21 of a joint. The radial arms are constructed from a section of tubular cross-section 38, split at the ends, and the ends flared outwardly at 39 and 40.

Fig. 10 illustrates the same dowel 25, spanning a joint in the same manner, the sleeves 41 being provided with a flanged hub 42 forming the outer wall thereof and a like flanged hub 43 at the inner face thereof conencted with webs or fins 44.

Fig. 12, like Fig. 8, illustrates the short dowel 25 and a cushion cap 35. The sleeve 34 has been omitted. The radial arms comprise a flat bar 45 affixed to the dowel at 46 near or adjacent the face of the slab. The bar 45 is formed upwardly to approach the top surface of the slab and then down and in contact with the outer end of the dowel at 47, thus entering and returning through the area of tension, whereas the lower leg of the bar 45 is carried down through the area of compression and back up to the dowel at 48. Punch outs 49 from the leg 48, are arranged to carry reinforcing steel, either bars or mesh 50.

Fig. 13 also shows the short dowel 25 and cap 35. The sleeves and radial arms are here formed of relatively flat bars wrapped around the dowel at 51 to form the sleeve, the ends of the bars extending radially therefrom to form the radial arms 52.

Figs. 14 and 15 illustrate the dowel 25 enclosed within sleeves 53. Here the radial arms are shown in the form of a wire spider comprising pairs of parallel sections 54—54 connected at their outer ends with like parallel sections 55—55. And again, as before, the members 54 enter and return through the areas of tension and compression.

Fig. 16 illustrates a split dowel comprised of like tapering sections 56, offset at 57, lapped and encased in a sleeve 58 with end enclosures 59. The radial arms 60 as before being affixed to the dowel 56 in pairs.

The foregoing discussion of the illustrations shown on the drawings has applied in general to poured concrete—cast in situ: and whereas I have not shown any specific means for holding down the joint embodying this dowel bar structure, it is understood that I may resort to any of the well known forms of stake pins or other devices well known in the art without departing from the spirit of my invention. And further, I do not wish to limit myself as to the positioning of the joint or structure, as location is not specific to my invention.

In existing concrete structures where it is desirous to add to or patch with new concrete, I propose to anchor a sleeve 61 into the existing structure by means of the usual expanded lead sleeve or similar device 62 and taper nut 63 as clearly shown at Fig. 17. Here the original form of sleeve 26 and anchors 30 are then connected by means of the dowel 25, spanning the construction joint, and the new work poured in place.

Pre-cast concrete, art marble, imitation stone, glass, terracotta, and many similar products are gaining favor in the building industry of today. Many times these preferred products would be used in places where they are not now used if it were possible to effectively transmit a load from one to the next adjoining section. Fig. 18 illustrates the application of my dowel bar structure to such or similar fields of work. The drawings illustrate how the sleeves 26 with the radial arms 30 may be cast in place at the factory— the finished slabs delivered to the job, and the short dowel 25 interposed as the slabs are set in place.

I, therefore, do not claim broadly the idea of reinforcing a concrete slab against failure in tension which is the basic principle of concrete reinforcing, but I have endeavored to clearly express a new concept which involves the principles of first absorbing a load from a concrete structure; next centralizing and confining this load to a unitary formation; carrying this load from one structure to an adjacent but independent structure; and thence distributing or dissipating the load into the adjacent structure.

What I claim as new and desire to secure by Letters Patent is:

1. Means for bridging a joint in concrete slab construction comprising a load carrying bar for extending between adjacent slabs, and slab reinforcing members operatively associated with the bar on each side of the joint and having a plurality of load carrying members adapted to extend into the body of the associated slab both above and below the bar for transmitting loads between the bar and slab, one of said load carrying members on each reinforcing member adapted to extend through the slab and rest upon the subgrade and additionally serve as a support for the bar prior to and during the pouring of the concrete.

2. Means for bridging a joint in concrete slab construction comprising a load carrying bar for extending between adjacent slabs, a sleeve closely fitting the bar on each side of the joint adjacent the opposed slab faces, each sleeve having immediately adjacent its associated slab face an enlarged portion encircling the sleeve for transmitting load directly thereto and thence to the bar, and slab reinforcing means carried by each sleeve for extending into the slabs on each side of the joint, a portion of said reinforcing means adapted to rest upon the subgrade and support the bar prior to and during the pouring of the concrete.

3. A reinforced self-supporting joint unit for concrete road slabs, comprising, in combination, with an expansion joint extending vertically throughout the depth of the adjacent slabs and adapted to rest on the sub-grade, a reinforcing dowel extending between said adjacent slabs and through the said expansion joint structure, and reinforcing members engaged with said dowel to prevent rotation thereof, said members being arranged on each side of the joint and including reinforcing elements diverging from the sides of the joint at the location of the dowel into the slabs above and below the dowel and also including base portions adapted to rest on the subgrade to support the entire unit during the pouring of the concrete or equivalent plastic.

4. A load transfer device for bridging a gap between the adjacent end faces of two substantially horizontally aligned concrete slabs comprising two counterpart and relatively reversed rigid major members each having its integrated parts arranged to be imbedded in its respective slab, each major member comprising a cup-like sleeve portion opening at the end face of the slab in which that member is imbedded and adapted to have the axis of its bore horizontal and at right angles to said slab end and substantially within the neutral plane of the slab, a dowel-like bridging member arranged to seat and have bearing in the bore of the cup-like sleeve portion of one major member and adapted to project beyond the end face of its respective slab and to bridge the gap intervening between the adjacent end faces of the adjoining slabs and to extend into and slidably engage the bore of the cup-like sleeve portion of the other associated major member, and an anchor member rigidly engaged with the outer walls of the sleeve portion of each major member respectively and arranged to extend downwardly therefrom and to pass through its respective slab and rest directly upon the subgrade supporting the slab and thereby serve as a support for the device prior to and during the pouring of the concrete slab.

CLIFFORD H. WESTCOTT.